US008778056B2

(12) United States Patent
Uchikawa et al.

(10) Patent No.: US 8,778,056 B2
(45) Date of Patent: Jul. 15, 2014

(54) ZEOLITE MEMBRANE AND PROCESS FOR PRODUCING ZEOLITE MEMBRANE

(75) Inventors: Tetsuya Uchikawa, Nagoya (JP); Kenji Yajima, Nagoya (JP); Makiko Niino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/543,977

(22) Filed: Jul. 9, 2012

(65) Prior Publication Data

US 2012/0272826 A1    Nov. 1, 2012

Related U.S. Application Data

(63) Continuation of application No. PCT/JP2011/054181, filed on Feb. 24, 2011.

(30) Foreign Application Priority Data

Feb. 25, 2010    (JP) ................... 2010-039929

(51) Int. Cl.
| | | |
|---|---|---|
| *B01D 53/22* | (2006.01) | |
| *B01D 71/02* | (2006.01) | |
| *B01D 69/10* | (2006.01) | |
| *B01D 67/00* | (2006.01) | |
| *B05D 5/00* | (2006.01) | |

(52) U.S. Cl.
USPC ............... 96/8; 96/4; 96/11; 95/45; 95/48; 95/50; 95/51; 502/4; 427/203

(58) Field of Classification Search
USPC ............. 96/4, 8, 10, 11; 95/45, 50, 51, 48; 502/4, 62, 64; 427/203, 243
See application file for complete search history.

(56) References Cited

U.S. PATENT DOCUMENTS

| 5,871,650 A * | 2/1999 | Lai et al. ........................ 96/11 |
| 2002/0111522 A1 | 8/2002 | Overbeek et al. |

(Continued)

FOREIGN PATENT DOCUMENTS

| EP | 1 661 616 A1 | 5/2006 |
| JP | 2005-029461 A1 | 2/2005 |

(Continued)

OTHER PUBLICATIONS

Kanazirev et al., "The Effect of O2 on the Thermal Activation of Zeolite Beta", Journal of Catalysis, 1996, vol. 161, pp. 156-163.*

(Continued)

*Primary Examiner* — Jason M Greene
(74) *Attorney, Agent, or Firm* — Burr & Brown, PLLC (57) ABSTRACT

There are provided a process for producing a zeolite membrane which, even when large, has few defects and which has higher separation performance than conventional zeolite membranes, and a zeolite membrane obtained by the process. In the process, the structure-directing agent is removed in the atmosphere having an $O_2$ concentration of 22.0 vol % or more. Specifically, the process includes: a particle adhesion step of allowing zeolite particles functioning as seeds to flow down the surface of the substrate by means of the weight of the slurry itself, thereby adhering to the substrate and a membrane-forming step of forming a zeolite membrane on the substrate by immersing the substrate having the zeolite particles adhering thereto in sol containing the structure-directing agent for hydrothermal synthesis, thereby forming a zeolite membrane on the substrate.

16 Claims, 7 Drawing Sheets

(56) References Cited

U.S. PATENT DOCUMENTS

| | | |
|---|---|---|
| 2004/0010176 A1 | 1/2004 | Yeh et al. |
| 2004/0014592 A1 | 1/2004 | Yeh et al. |
| 2004/0173094 A1* | 9/2004 | Nakayama et al. .................. 96/4 |
| 2005/0154243 A1 | 7/2005 | Yeh et al. |
| 2005/0194289 A1 | 9/2005 | Overbeek et al. |
| 2005/0229779 A1 | 10/2005 | Nakayama et al. |
| 2006/0210472 A1 | 9/2006 | Hastoy et al. |
| 2006/0245994 A1 | 11/2006 | Watanabe et al. |
| 2009/0011926 A1* | 1/2009 | Yajima et al. .................... 502/62 |
| 2010/0298115 A1 | 11/2010 | Yajima et al. |
| 2012/0006194 A1* | 1/2012 | Falconer et al. .................. 96/11 |

FOREIGN PATENT DOCUMENTS

| | | |
|---|---|---|
| JP | 2006-248892 A1 | 9/2006 |
| JP | 2006-524180 A1 | 10/2006 |
| JP | 4204273 B2 | 1/2009 |
| JP | 2009-214075 A1 | 9/2009 |
| WO | 02/32812 A2 | 4/2002 |
| WO | 2007/105407 A1 | 9/2007 |
| WO | 2009/113715 A1 | 9/2009 |

OTHER PUBLICATIONS

Heng et al., "Low-temperature Ozone Treatment for Organic Template Removal from Zeolite Membrane", Journal of Membrane Science, 2004, vol. 243, pp. 69-78.*

International Search Report and Written Opinion dated May 24, 2011.

Extended European Search Report (Application No. 11747471.8) dated Oct. 4, 2013.

* cited by examiner

ZEOLITE MEMBRANE AND PROCESS FOR PRODUCING ZEOLITE MEMBRANE

BACKGROUND OF THE INVENTION

1. Field of the Invention

The present invention relates to a zeolite membrane and a process for producing a zeolite membrane.

2. Description of Related Art

Zeolite is used as a catalyst, a catalyst carrier, an adsorber, or the like. A zeolite membrane-provided body wherein a membrane is formed on a surface of the porous substrate made of metal or ceramic uses a zeolite molecular sieve function and is used as a gas separation membrane and a pervaporation membrane.

There are present many kinds (types) of zeolite such as LTA, MFI, MOR, FER, FAU, and DDR. For example, a DDR (Deca-Dodecasil 3R) type zeolite contains silica as the main component and is formed by a polyhedron containing pores having an oxygen eight-membered ring having a pore diameter of 4.4×3.6 angstrom. Since the DDR type zeolite has a small pore diameter, the use as a molecular sieve membrane for low molecular gas such as carbon dioxide ($CO_2$), methane ($CH_4$), ethane ($C_2H_6$).

For example, Patent Document 1 discloses a process for producing a zeolite membrane, where a DDR type zeolite membrane is formed by immersing a porous substrate in a raw material solution containing 1-adamantanamine, silica, and water for hydrothermal synthesis of a DDR type zeolite in the presence of a DDR type zeolite seed crystal.

In addition, Patent Document 2 discloses a process for producing a zeolite membrane using a raw material solution containing a DDR type zeolite powder.

PRIOR ART DOCUMENT

Patent Document

Patent Document 1: WO No. 2007/105407 pamphlet
Patent Document 2: Japanese Patent No. 4204273

In a zeolite membrane containing a structure-directing agent, it is necessary to remove the structure-directing agent after the membrane is formed. The structure-directing agent is an organic molecule used as a structure-forming agent for forming a pore structure inherent to zeolite and is called as a template agent or a template. The removal of the structure-directing agent is generally performed by firing in the ambient atmosphere. Since the structure-directing agent remains without being decomposed at a position where the membrane is thick and expands, it causes generation of a defect (crack) in a membrane.

Regarding a disc shaped membrane or a small tube-shaped membrane, a relatively homogeneous membrane is formed as a whole, and membranes showing good performance have been obtained. On the other hand, it is necessary to form a membrane on a large monolith-shaped substrate having a large membrane area for practical use. However, in the case of forming a membrane on a substrate having a complex shape such as a monolith shape, there are many cases of having a difference in membrane thickness depending on the positions, and a defect is caused in the membrane upon removal of the structure-directing agent at positions where the membrane is thick. Therefore, it has been impossible to provide a large membrane having little defect amount as a whole and showing high separation performance.

The present invention aims to provide a zeolite membrane having little defect amount and showing high separation performance and a process for producing a zeolite membrane, the process being capable of forming such a zeolite membrane.

SUMMARY OF THE INVENTION

The present inventors found out that the aforementioned problems can be solved by increasing the oxygen concentration more than that in the ambient atmosphere in the structure-directing agent removal step. That is, according to the present invention, there is provided the following zeolite membrane and a method for manufacturing the zeolite membrane.

[1] A zeolite membrane formed on internal wall faces of cells of a porous monolith substrate having a plurality of cells formed from one end face to the other end face in a longitudinal direction, wherein the zeolite membrane is formed so that standard deviation of gas permeation amount of each cell formed in the longitudinal direction of the monolith substrate after removing a structure-directing agent, which is measured by using a gas having a molecular diameter larger than a pore diameter of zeolite, is 6 [$L/m^2 \cdot s \cdot MPa$] or less.

[2] The zeolite membrane according to [1], wherein the monolith substrate has an outer diameter of 28 mm or more and an entire length of 100 mm or more.

[3] The zeolite membrane according to [1] or [2], wherein the monolith substrate has a plurality of cells at a rate of 1 cell/$cm^2$ or more in a unit area of the aforementioned end face of the monolith substrate.

[4] The zeolite membrane according to any one of [1] to [3], wherein the length of the longest diameter in a cross section of a cell perpendicular to the longitudinal direction of the cell of the monolith substrate is 10 mm or less.

[5] The zeolite membrane according to any one of [1] to [4], wherein the zeolite membrane is DDR type zeolite membrane.

[6] The zeolite membrane according to any one of [1] to [5], wherein the gas having a molecular diameter larger than the pore diameter of zeolite is $CF_4$.

[7] A process for producing a zeolite membrane, wherein the structure-directing agent is removed by heating a zeolite membrane containing the structure-directing agent and being formed on the substrate by hydrothermal synthesis in an atmosphere having an $O_2$ concentration of 22.0 vol % or more.

[8] The process for producing a zeolite membrane according to [7], the method comprising: a particle adhesion step of allowing zeolite particles functioning as seeds to adhere to the substrate, a membrane-forming step of forming a zeolite membrane on the substrate by immersing the substrate having the zeolite particles adhering thereto in sol containing the structure-directing agent for hydrothermal synthesis, and a structure-directing agent removal step of removing the structure-directing agent in the atmosphere having an $O_2$ concentration of 22.0 vol % or more.

[9] The process for producing a zeolite membrane according to [7] or [8], wherein the substrate is a monolith substrate.

[10] The process for producing a zeolite membrane according to any one of [7] to [9], wherein the zeolite membrane is a DDR type zeolite membrane.

[11] The process for producing a zeolite membrane according to any one of [7] to [10], wherein the structure-directing agent removal temperature for removing the structure-directing agent is 300° C. or more.

[12] The zeolite membrane obtained by removing the structure-directing agent by any process for producing a zeolite membrane according to any one of [7] to [11].

In a method for manufacturing a zeolite membrane of the present invention, decomposition of structure-directing agent by oxygen is facilitated to reduce defects generated upon removing the structure-directing agent by increasing the oxygen concentration to be higher than that in the ambient atmosphere in the structure-directing agent removal step. Even in a large membrane which easily has a difference in membrane thickness, a crack generating at a position having large membrane thickness can be inhibited, and a membrane having uniform membrane performance and a high separation performance can be provided. Even the membrane which does not exhibit gas separation performance in removal of a structure-directing agent in the ambient atmosphere exhibits gas separation performance in the structure-directing agent removal step of the present invention, and the yield is improved.

DETAILED DESCRIPTION OF THE INVENTION

Hereinbelow, embodiments of the present invention will be described with referring to drawings. The present invention is by no means limited to the following embodiments, and changes, modifications, and improvements may be added as long as they do not deviate from the scope of the invention.

Figure 1:
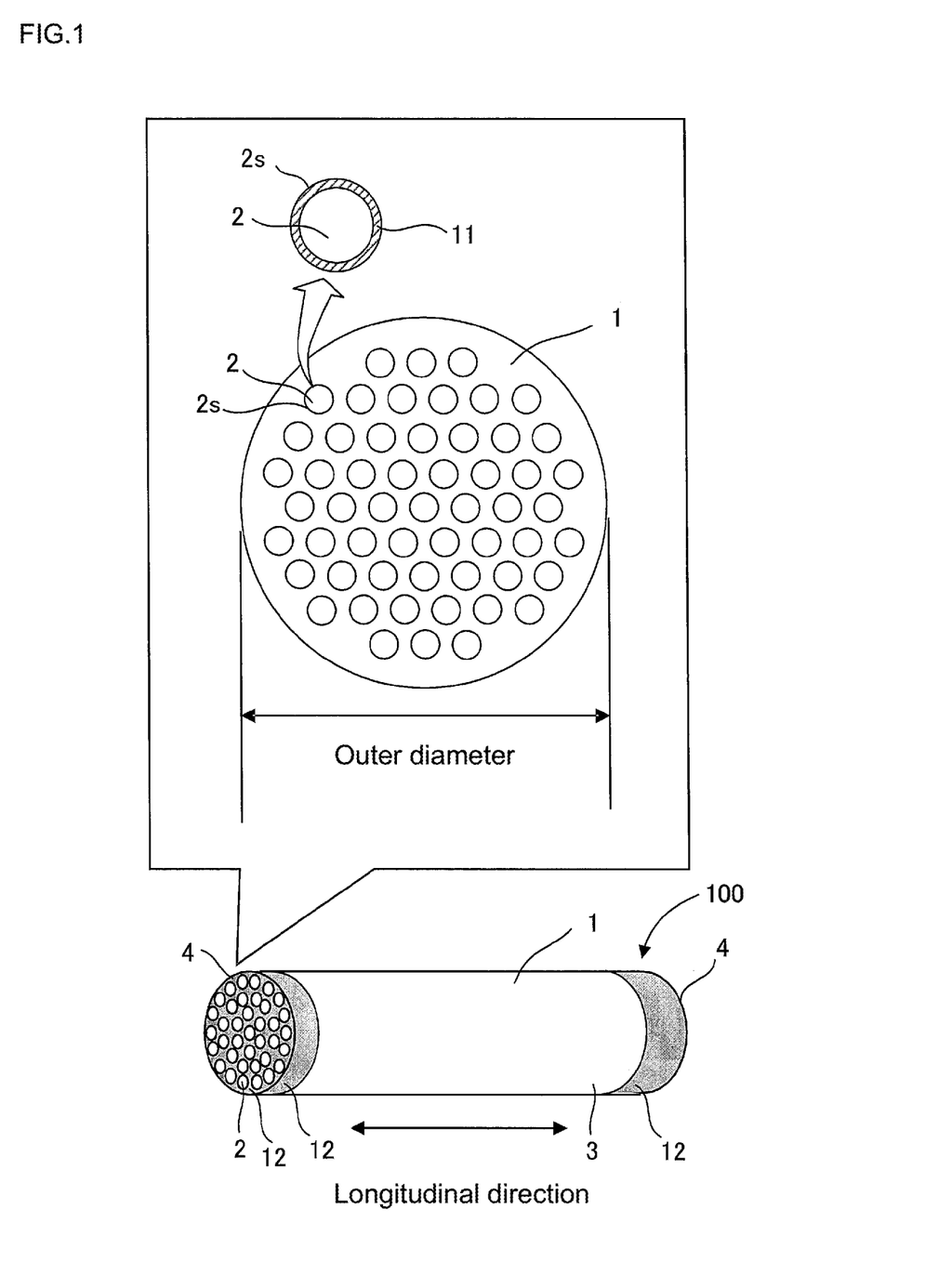
FIG. 1 is a schematic view showing a zeolite membrane—provided body where a zeolite membrane is disposed.

FIG. 1 shows a zeolite membrane-provided body 100 where a zeolite membrane 11 of the present invention is disposed. The zeolite membrane 11 of the present invention is the zeolite membrane 11 formed on the internal wall faces 2s of the cells 2 of the monolith substrate 1. The standard deviation of gas permeation amount of each cell of the monolith substrate after removing a structure-directing agent, which is measured by using a gas having a molecular diameter larger than a pore diameter of zeolite, is 6 [L/m²·s·MPa] or less. Incidentally, the standard deviation S is obtained by the following formula with the gas permeation amount of each cell as x and the number of cells where the gas permeation amount is measured as n.

$$S = \sqrt{\frac{n\sum_{i=1}^{n} x_i^2 - \left(\sum_{i=1}^{n} x_i\right)^2}{n(n-1)}} \quad \text{[Formula 1]}$$

Figure 2A:
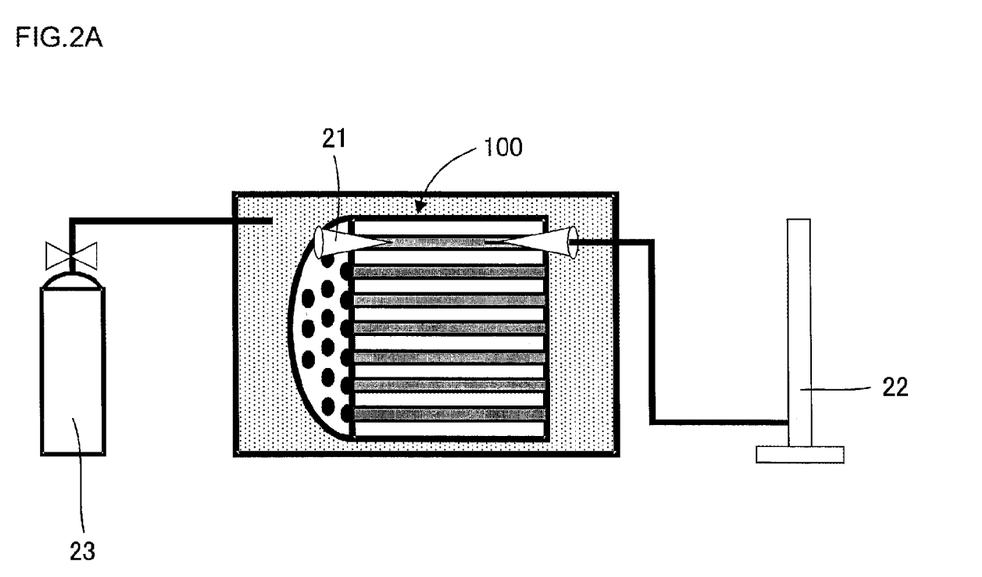
FIG. 2A is a view for describing the measurement of a gas permeation amount.

The standard deviation of the gas permeation amount of each cell 2 means the standard deviation of the gas permeation amount of each cell 2 in the case that the gas permeation amount of cells 2 of the monolith substrate 1 is measured independently by the use of a gas having a molecular diameter larger than a pore diameter of zeolite. More specifically, it is obtained as follows. As shown in FIG. 2A, an end of a cell 2 to be measured is sealed by a plug 21 such as a silicone plug, and the other end of the cell 2 is connected to a flowmeter 22 such as a soap membrane flowmeter. Then, a gas having a molecular diameter larger than a pore diameter of zeolite, such as $CF_4$, (evaluation gas) is supplied (e.g., 0.2 MPa) from the outer surface of the monolith substrate 1 by a gas cylinder 23, and the time until a certain amount of the evaluation gas leaks out (e.g., 0.5 cc) from the cell 2 is measured to calculate the permeation amount of the evaluation gas. The measurement is carried out for all the cells, and the standard deviation of the gas permeation amount of the evaluation gas is calculated from the data of the permeation amount of the evaluation gas in each cell 2. The zeolite membrane 11 of the present invention is a zeolite membrane formed on the monolith substrate 1, and the standard deviation of the gas permeation amount is 6 [L/m²·s·MPa] or less. Since the monolith substrate 1 is a porous substrate, a small standard deviation of the gas permeation amount means that the zeolite membrane 11 has homogeneous membrane performance at every position.

The zeolite membrane 11 of the present invention is, for example, a DDR type zeolite membrane 11. That is, the kind of the zeolite constituting the zeolite membrane 11 is a DDR type zeolite. It may be a MFI type or MOR type zeolite membrane 11.

As shown in FIG. 1, the zeolite membrane 11 of the present invention is formed on the internal wall faces of the cells 2 of the porous monolith substrate 1. The "monolith substrate" in the present invention means a substrate having a shape where a plurality of cells are formed from one end face to the other end face in the longitudinal direction or a honeycomb shape. As the material for the monolith substrate 1, preferred are ceramic materials such as alumina, silica, cordierite, mullite, titania, zirconia, and silicon carbide from the viewpoints of strength and chemical stability. The porosity of the monolith substrate 1 is preferably about 10 to 60% from the viewpoints of the strength and permeability of the substrate. The average pore size of the porous substrate is preferably about 0.005 to 5 µm.

The monolith substrate 1 has 37 to 2500 cells 2 which pass through between both the ends in the longitudinal direction and are parallel to the longitudinal direction. The zeolite membrane 11 is formed on the internal wall faces of the cells 2.

Figures 7, 8A:
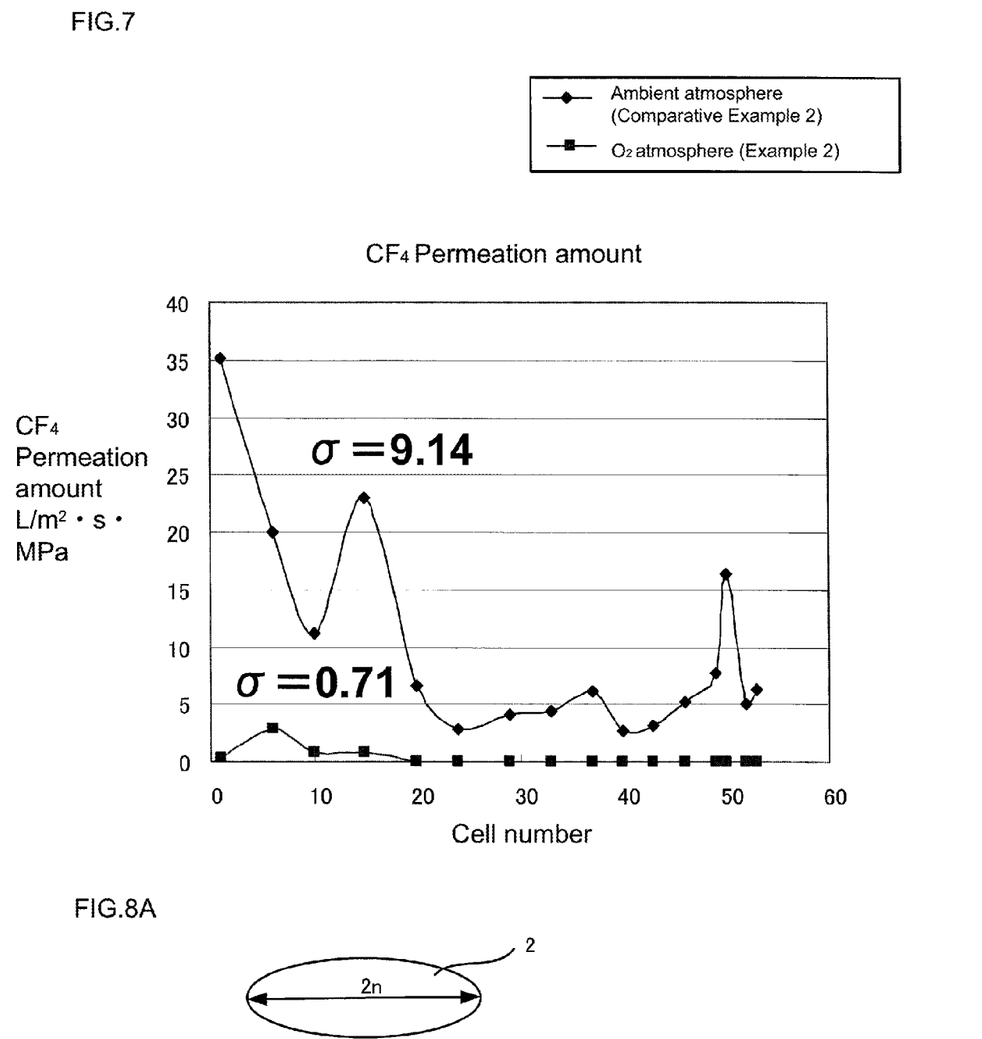
FIG. 7 is a graph showing a result of measurement of a gas permeation amount.
FIG. 8A is a schematic view showing an embodiment of a cell having an elliptic cross section perpendicular to the longitudinal direction.
Figure 8B:
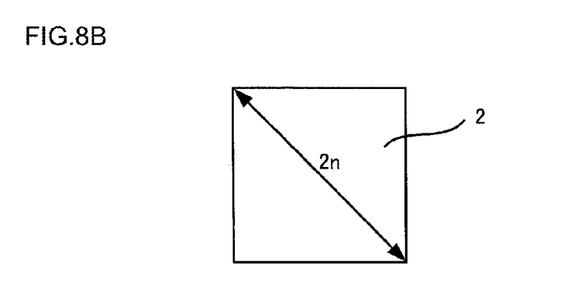
FIG. 8B is a schematic view showing an embodiment of a cell having a quadrangular cross section perpendicular to the longitudinal direction.
Figure 8C:
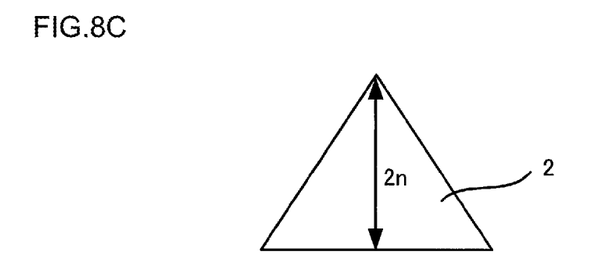
FIG. 8C is a schematic view showing an embodiment of a cell having a triangular cross section perpendicular to the longitudinal direction.
Figure 8D:
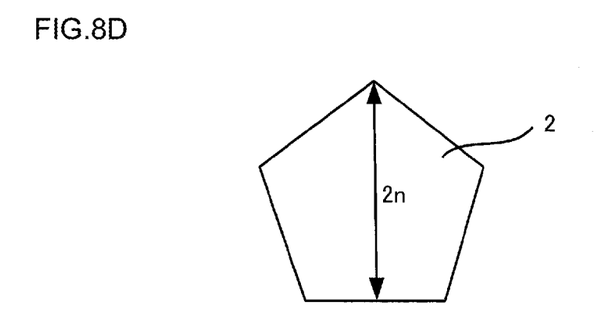
FIG. 8D is a schematic view showing an embodiment of a cell having a pentagonal cross section perpendicular to the longitudinal direction.

Though there is no limitation on the size of the monolith substrate 1 for forming the zeolite membrane 11 of the present invention, the zeolite membrane 11 formed on the monolith substrate 1 having an outer diameter of 28 mm or more and an entire length of 100 mm or more is a zeolite membrane 11 having homogeneous membrane performance in comparison with conventional zeolite membranes 11. Though there is no particular limitation on the shape of a cross section perpendicular to the longitudinal direction of the monolith substrate 1 of a cell 2, there may be employed a circle, an ellipse, a triangle, a quadrangle, a pentagon, a hexagon, or a heptagon. It is preferable that the length of the longest diameter (longest diameter $2n$) in a cross section of a cell 2 perpendicular to the longitudinal direction of the monolith substrate is 10 mm or less. FIGS. 8A to 8D show embodiments of the shapes of the cells 2 and the longest diameters $2n$. FIG. 8A is an elliptic embodiment, FIG. 8B is a quadrangular embodiment, FIG. 8C is a triangular embodiment, and FIG. 8D is a pentagonal embodiment. It is preferable to have the cells 2 where the longest diameter (longest diameter $2n$) in a cross section of a cell perpendicular to the longitudinal direction of the cell of the monolith substrate is 10 mm or less at a rate of one cell/cm$^2$ or more in a unit area of en end face 4 of the monolith substrate 1. By forming the zeolite membrane 11 on the internal wall faces $2s$ of such cells 2, a membrane area for obtaining a practically sufficient treatment amount as a separation membrane can be secured to be able to play the function.

It is preferable that a seal portion 12 is disposed in each of the end faces 4, 4 of the monolith substrate 1. The seal portion 12 is disposed on both the entire end faces 4, 4 of the monolith substrate 1 so as not to seal the cells 2. In addition, it is preferable that the seal portion 12 is disposed also in the vicinity of the end faces 4 on the side face 3. The disposition of the sealing portions 12 in such a manner can inhibit a part of a mixture from directly flowing into the inside of the monolith substrate 1 from an end face 4 of the monolith substrate 1 without passing the separation membrane 11, being mixed with gas and the like passed through the separation membrane 11, and being discharged from the side face 3.

Examples of the sealing portion 12 include glass sealing and metal sealing. Of these, glass sealing is preferable in that the thermal expansion coefficient can easily match that of the monolith substrate 1. Though there is no particular limitation on the properties of the glass used for glass sealing, it is preferable to have a thermal expansion coefficient close to that of the monolith substrate 1.

A process for producing a zeolite membrane of the present invention is a process where the structure-directing agent is removed by heating a zeolite membrane containing the structure-directing agent and being formed on the substrate by hydrothermal synthesis in an atmosphere having an $O_2$ concentration of 22.0 vol % or more. More specifically, the process includes a particle adhesion step of allowing zeolite particles functioning as seeds to adhere to the substrate 1, a membrane-forming step of forming a zeolite membrane 11 on the substrate 1 by immersing the substrate 1 having the zeolite particles adhering thereto in sol containing the structure-directing agent for hydrothermal synthesis, and a structure-directing agent removal step of removing the structure-directing agent in the atmosphere having an $O_2$ concentration (oxygen concentration) of 22.0 vol % or more. The $O_2$ concentration in the structure-directing agent removal step is more preferably 35 vol % or more, furthermore preferably 45 vol % or more. The $O_2$ concentration in this range enables to obtain a zeolite membrane having little defect amount even in a large membrane and having high separation performance.

As the substrate, a monolith substrate can be used. In addition, in a substrate having a distribution in membrane thickness as a whole, such as a large plate or a long tube, an effect due to removal of a structure-directing agent by heating in the atmosphere having an $O_2$ concentration of 22.0 vol % or more can be obtained.

A process for producing a zeolite membrane 11 of the present invention can be employed as a process for producing zeolite having a crystal structure such as MFI, MOR, or DDR, the process having the structure-directing agent removal step. In particular, it can be employed as a process for producing a DDR type zeolite.

The temperature for removing the structure-directing agent in the structure-directing agent removal step is preferably 300° C. or more, more preferably 400 to 700° C., furthermore preferably 400 to 600° C.

Hereinbelow, with the case of DDR type zeolite as an example, a process for producing a zeolite membrane 11 will specifically be described with referring to FIGS. 3 and 4.

[1] Preparation of Slurry for Seeding and Seeding (Particle Adhesion Step)

A DDR type zeolite crystal powder is produced and pulverized as necessary to be used as seed crystals. The DDR type zeolite powder (which functions as seed crystals) is added to a solvent and dispersed thereinto obtain slurry (slurry for seeding). The slurry for seeding is preferably diluted by a solvent so that a solid content concentration contained therein becomes 1 mass % or less. The solvent for dilution is preferably water, ethanol, or an ethanol aqueous solution. As the solvent used for dilution, there may be used acetone, an organic solvent such as IPA, or an organic solvent aqueous solution besides water and ethanol. Since the use of an organic solvent having high volatility enables to shorten the drying time and to reduce the permeation amount of the slurry for seeding at the same time, a thinner zeolite membrane can be formed. As a method for dispersing the DDR type zeolite powder in the slurry 34, a general agitation method may be employed. However, a method such as a supersonic treatment may be employed.

Next, a particle adhesion step of allowing the zeolite particles functioning as seeds to adhere to the substrate 1 is performed. The substrate 1 functioning as the support may be non-porous or porous. As the support, there may suitably be used a non-porous or porous material made of ceramic such as alumina, zirconia, or mullite; glass; zeolite; clay; metal; carbon; or the like.

In the particle adhesion step, it is preferable to employ a flow-down method where the slurry 34 is allowed to flow down by means of the weight of the slurry itself. The flowing-down in the particle adhesion step means that the slurry 34 flows down the surface of the substrate by subjecting the slurry 34 to free fall on the substrate 1 by means of the weight of the slurry itself. In the flow-down method, the slurry 34 is allowed to flow into the cylindrical holes of the substrate 1 to allow a large amount of slurry to flow in parallel with the faces. Thus, the slurry 34 allowed to flow down flows down the surface of the substrate by means of the weight of the slurry itself. Therefore, it has little permeation into the substrate 1. By masking the side face 3 of the substrate 1 in advance before allowing the slurry 34 to flow down, the permeation of slurry into the substrate 1 can be reduced.

Figure 3:
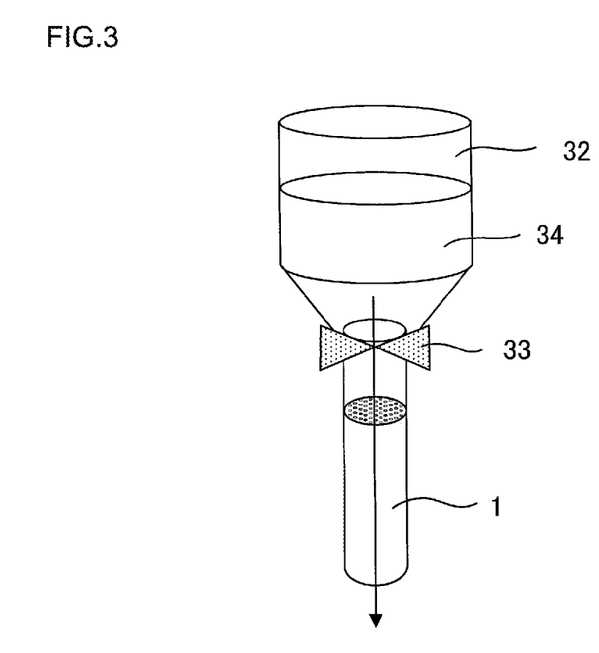
FIG. 3 is a schematic view for describing seeding by a flow-down method.
Figure 4:
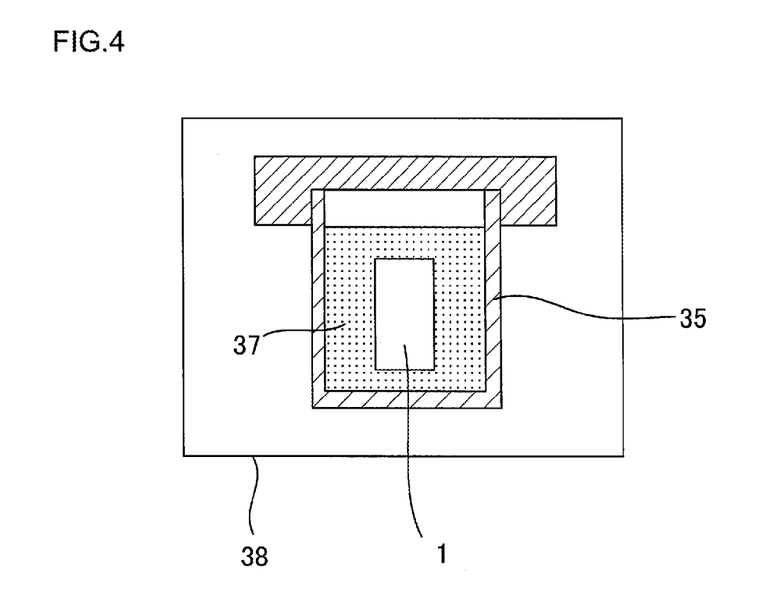
FIG. 4 is a schematic view for describing a hydrothermal synthesis.

FIG. 3 shows an embodiment of seeding by the flow-down method (particle adhesion step). In the case of employing a porous monolith shape (shape having a plurality of through-holes (cell 2) from one end face 4 to the other end face 4 in the longitudinal direction) for a substrate 1, as shown in FIG. 3, seeding can be performed by fixing the substrate 1 to the lower end of a wide-mouth funnel 32 and opening the cock 33 to allow the slurry 34 for seeding to flow down from the top portion and to pass through the cells.

The solid content concentration in the slurry 34 for seeding (particle adhesion step) is preferably 0.00001 to 1 mass %. When the concentration is below the lower limit of the concentration range, the number of steps increases to cause high costs. When the concentration is above 1 mass % a thick zeolite particle layer is formed on the surface of the substrate, and the thick membrane causes low flux.

It is preferable to perform the step of allowing the slurry 34 containing zeolite particles functioning as seeds to flow down (FIG. 3) plural times in the particle adhesion step. The plural times mean about 2 to 10 times. More than 10 times require much workload to increase costs. The number is preferably up to about 8, more preferably about 2 to 6. Performing the step plural times enables the zeolite particles to adhere to the surface of the substrate 1 over the entire surface without unevenness.

It is preferable that a process for producing a zeolite membrane 11 of the present invention includes a step of allowing the slurry 34 containing zeolite particles to flow down after the substrate 1 is put upside down after the slurry 34 containing zeolite particles functioning as seeds is allowed to flow down. This enables zeolite particles to uniformly adhere to the surface of the substrate 1 without unevenness.

It is preferable that a process for producing a zeolite membrane 11 of the present invention includes a draught drying step after the slurry 34 containing zeolite particles functioning as seeds is allowed to flow down. The draught drying means that the slurry 34 is dried by sending wind to the surface of the substrate 1 where the slurry 34 containing zeolite particles adhere. The draught drying raises the drying rate and enables zeolite particles moving with the movement of the liquid upon vaporization of the liquid to concentrate on the surface.

The particle adhesion step is not limited to the flow-down method, and another method may be performed. However, the flow-down method is preferable from the viewpoint of reducing the permeation into the substrate 1.

[2] Preparation of Raw Material Solution (Sol)

Next, there is prepared a raw material solution having a predetermined composition containing 1-adamantanamine dissolved in ethylenediamine.

Since 1-adamantanamine is a SDA (structure-directing agent) in synthesis of DDR type zeolite, that is, a substance (structure-directing agent) functioning as a template for forming a DDR zeolite crystal structure, a molar ratio to $SiO_2$ (silica) serving as a raw material for DDR type zeolite is important. The molar ratio of 1-adamantanamine to $SiO_2$ is necessarily within the range from 0.002 to 0.5, preferably 0.002 to 0.4, more preferably 0.002 to 0.3. When the molar ratio of 1-adamantanamine to $SiO_2$ is below the range, 1-adamantanamine in SDA is insufficient, and formation of DDR type zeolite is difficult. On the other hand, when it is above the range, high-priced 1-adamantanamine is added more than necessary, which is not preferable from the viewpoint of the production costs.

Since 1-adamantanamine dissolves slightly in water functioning as a solvent of the hydrothermal synthesis, after it is dissolved in ethylenediamine, it is used for preparation of a raw material solution. By completely dissolving 1-adamantanamine in ethylenediamine to prepare a raw material solution in a uniform state, it becomes possible to form a DDR type zeolite having a uniform crystal size. The molar ratio of ethylenediamine to 1-adamantanamine is necessarily in the range from 4 to 35, preferably 8 to 24, more preferably 10 to 20. When the molar ratio of ethylenediamine to 1-adamantanamine is below this range, the ethylenediamine amount is insufficient as the amount for completely dissolving 1-adamantanamine. On the other hand, when the ratio is above the range, ethylenediamine is used more than necessary, which is not preferable from the viewpoint of the production costs.

In a production process of the present invention, for example, colloidal silica can be used as a silica source. Though a commercially available colloidal silica can suitably be used as the colloidal silica, it can be prepared by dissolving a fine powdered silica in water or subjecting alkoxide to hydrothermal decomposition.

The molar ratio of water to $SiO_2$ (silica) contained in the raw material solution (water/$SiO_2$ molar ratio) is necessarily within the range from 10 to 500, preferably 14 to 250, more preferably 14 to 112. When the water/$SiO_2$ molar ratio is below the range, it is not preferable in that a large amount of unreacted $SiO_2$, which is not crystallized, remains because the $SiO_2$ concentration of the raw material solution is too high. On the other hand, when the ratio is above this range, it is not preferable in that the DDR type zeolite cannot be formed because the $SiO_2$ concentration of the raw material solution is too low.

According to a production method of the present invention, there can be manufactured DDR type zeolite containing aluminum and a metal cation in the framework (hereinbelow referred to as "low silica type DDR type zeolite") besides all silica type DDR type zeolite. Since the low silica type DDR type zeolite has a cation in the pores, it is different in adsorption performance and catalyst performance from the all silica type DDR type zeolite. When the low silica type DDR type zeolite is produced, an aluminum source and a cation source are added besides water as a solvent and colloidal silica as a silica source to prepare a raw material solution.

As the aluminum source, there can be used aluminum sulfate, sodium aluminate, aluminum metal, or the like. The $SiO_2/Al_2O_3$ molar ratio in the case of converting aluminum as an oxide is necessarily within the range from 50 to 1000, preferably 70 to 300, more preferably 90 to 200. When the $SiO_2/Al_2O_3$ molar ratio is below this range, it is not preferable in that the proportion of amorphous $SiO_2$ other than DDR type zeolite. On the other hand, when the ratio is above the range, it is not preferable in that it has no difference from all silica type zeolite because the properties as the low silica type DDR type zeolite can not be exhibited due to remarkable decrease of the amount of aluminum and cation though DDR type zeolite can be produced.

As the cation, there can be mentioned a cation of any of alkali metals, i.e., K, Na, Li, Rb, and Cs. As the cation source, there can be mentioned sodium hydroxide and sodium aluminate as examples of Na. The $X_2O/Al_2O_3$ molar ratio in the case of converting alkali metal into an oxide is necessary within the range from 1 to 25, preferably 3 to 20, more preferably 6 to 15. When the $X_2O/Al_2O_3$ molar ratio is below this range, it is not preferable in that the DDR type zeolite having the aimed $SiO_2/Al_2O_3$ molar ratio is hardly obtained. On the other hand, when the ratio is above this range, it is not preferable in that amorphous $SiO_2$ is mixed into a product.

Preparation of a raw material solution is described above, as a particularly preferable mode, there can be mentioned a method of preparing a raw material solution, where a solution obtained by dissolving 1-adamantanamine in ethylenediamine, water as a solvent, and colloidal silica (in the case of synthesizing a low silica type DDR, further aluminum sulfate as the aluminum source and sodium hydroxide as the cation source) are mixed together at a predetermined ratio and dissolved.

[3] Membrane Formation (Membrane-Forming Step)

A container (e.g., wide-mouth bottle) containing the raw material solution is set into a homogenizer for agitation to give a sol 37 to be used for hydrothermal synthesis. Next, as shown in FIG. 4, the substrate 1 subjected to seeding by the flow-down method is put in a pressure-resistant container 35.

After a sol 37 prepared is put in the container, these are put in a drier 38 and subjected to a heating treatment (hydrothermal synthesis) at 110 to 200° C. for 16 to 84 hours to produce a zeolite membrane 11.

The temperature of a heating treatment (synthesis temperature) is preferably 110 to 200° C., more preferably 120 to 180° C., particularly preferably 120 to 170° C. When the temperature of the heating treatment is below this range, it is not preferable in that DDR type zeolite cannot be formed. On the other hand, when the temperature is above this range, it is not preferable in that DOH type zeolite, which is not the aimed product, is formed by phase transition.

Regarding the time for a heating treatment (synthesis time) in the case of adding a DDR type zeolite powder to the substrate 1 by the flow-down method, very short time from a few hours to five days is sufficient. In a production process of the present invention, membrane formation of DDR type zeolite can be facilitated by allowing the DDR type zeolite powder to adhere to the substrate 1 by a flow-down method.

[4] Cleaning and Removal of Structure-Directing Agent

Next, the substrate 1 where the zeolite membrane 11 is formed is washed with water or cleaned at 80 to 100° C. and then taken out for drying at 80 to 100° C. The substrate 1 is put in an electric furnace to perform the structure-directing agent removal step of combusting and removing 1-adamantanamine of the structure-directing agent in pores of the zeolite membrane 11. In the structure-directing agent removal step, the heating is performed at the structure-directing agent removal temperature of 300° C. or more, preferably 400 to 700° C., for one to 200 hours in an atmosphere having an $O_2$ concentration of 22.0 vol % or more. This enables to form a thin and uniform zeolite membrane 11 having less defects than conventional membranes and having a thickness of 10 µm or less. The method of combustion and removal by increasing the oxygen concentration to be higher than that of the ambient atmosphere in the structure-directing agent removal step is particularly effective in the case of producing a zeolite membrane 11 disposed in a large-sized monolith substrate 1. The large-size where a production method of the present invention is particularly effective means a size where the membrane is hardly homogenized by a conventional method, and the substrate is, for example, a monolith substrate 1 having a diameter (outer diameter) of 30 to 200 mm or more. Even in a monolith substrate 1 having a diameter of below 30 mm, the method enables to obtain an effect of obtaining a membrane having less defects and more uniform performance than conventional production processes.

EXAMPLE

Hereinbelow, the present invention will be described in more detail on the basis of Examples. However, the present invention is not limited to these Examples.

Examples 1 to 4

Samples of Examples 1 to 4 were produced by the following (1) to (4).

(1) Seeding (Particle Adhesion Step)

A seed crystal dispersion liquid containing DDR type zeolite particles having a particle diameter of 0.5 µm or less was diluted by ion-exchange water or ethanol to adjust the seed crystal concentration to 0.001 to 0.36 mass %, and they were stirred at 300 rpm by a stirrer to obtain slurry for seeding. To the lower end of a wide-mouth funnel 32 was fixed a porous monolith substrate 1 (a porous substrate having an outer diameter of 30 mm and an entire length of 160 mm and having 55 through-holes (cells 2) having a diameter of 25 mm (see FIG. 1, both ends being sealed with glass), with 7.8 cells 2 per $cm^2$ in the unit area of an end face 4), and 160 ml of the slurry for seeding was allowed to flow down from the top portion of the substrate and to pass through the cells 2 (see FIG. 3). The inside of the cells 2 of the substrate 1 where the slurry was allowed to flow down was subjected to draught drying at room temperature to 80° C. with a wind velocity of 3 to 6 m/s for 30 to 60 minutes. The flowing down of slurry and the draught drying were repeated 2 to 5 times to obtain samples. After being dried, microstructure observation was performed by an electron microscope. It was confirmed that DDR particles were adhering to the surface of the substrate under the conditions of the Examples.

(2) Membrane (Membrane-Forming Step)

After 7.35 g of ethylenediamine (produced by Wako Pure Chemical Industries, Ltd.) was put in a 100 ml wide-mouth bottle made of fluororesin, 1.156 g of 1-adamantanamine (produced by Sigma-Aldrich, Inc.) was added and dissolved so that no deposition of 1-adamantanamine might remain. After 98.0 g of 30 mass % colloidal silica (Snowtex S produced by Nissan Chemical Industries, Ltd.) and 116.55 g of ion-exchange water were put in another container and slightly stirred, they were put in the wide-mouth bottle where ethylenediamine and 1-adamantanamine were mixed, and they were strongly shaken and mixed to prepare a raw material solution. Then, the wide-mouth bottle containing the raw material was set in a homogenizer for agitation for one hour. The substrate 1 where DDR particles were allowed to adhere in the particle adhesion step of (1) was disposed in a stainless steel pressure-resistant container 35 having a fluororesin inner cylinder having the internal capacity of 300 ml, and prepared raw material solution (sol 37) was put in the container to perform a heating treatment (hydrothermal synthesis) at 135 to 150° C. for 16 to 44 hours. According to observation of a cross section of a substrate 1 having a membrane formed thereon by a scanning electron microscope, the thickness of the DDR membrane was 1 to 10 µm.

(3) Measurement of He Permeation Amount after Forming Membrane

In order to investigate presence/absence of a defect in the membrane 11 after hydrothermal synthesis, after washing with water and drying after forming the membrane, the He permeation amount was measured. The He permeation amount was not more than the measurement limit (<0.018 L/min·m²·kPa) under the conditions of Examples, and it was confirmed that the entire surface was coated with the DDR membrane.

(4) Structure-Directing Agent Removal Step (Template Removal)

The coated membrane 11 was heated at 450° C. or 500° C. for 50 hours with allowing oxygen to flow at 100 to 200 cc/min., thereby combusting and removing 1-adamantanamine as a structure-directing agent in the pores. Incidentally, by allowing oxygen to flow at 100 to 200 cc/min., the $O_2$ concentration in the furnace was 45 vol % or more.

Examples 5 and 6

Examples 5 and 6 were produced by the same process as in Examples 1 to 4 with using a porous monolith substrate 1 (porous substrate having an outer diameter of 180 mm and an entire length of 1000 mm with 2050 through-holes (cells 2) having a diameter of 2.5 mm (see FIG. 1, both ends being sealed with glass)). That is, the zeolite membrane 11 was synthesized by a heating treatment (hydrothermal synthesis) at 135° C. for 52 or 62 hours with using slurry for seeding diluted by ethanol in the same manner as in above (1) to (3). The He permeation amount of the membrane after hydrothermal synthesis was not more than the measurement limit (<0.018 L/min·m²·kPa), and it was confirmed that the cells 2 of the monolith substrate 1 were coated with the DDR membrane. In the (4) structure-directing agent step, heating was performed at 450° C. for 50 hours with allowing oxygen to flow therein at 37 L/min. to combust and remove 1-adamantanamine as the structure-directing agent in the pores. Incidentally, by allowing oxygen to flow at 37 L/min., the $O_2$ concentration in the furnace was 50 vol % or more.

Comparative Example 1 to 4

The samples of Comparative Examples 1 to 4 were produced in the same manner as in Examples. That is, in the same manner as in the aforementioned (1) to (3), the zeolite membrane 11 was synthesized by hydrothermal synthesis in the same manner as in Examples with using slurry for seeding diluted by ion-exchange water or ethanol. The He permeation amount of the membrane after hydrothermal synthesis was not more than the measurement limit (<0.018 L/min·m²·kPa), and it was confirmed that the cells 2 of the monolith substrate 1 were coated with the DDR membrane. In the (4) structure-directing agent step, the coated membrane 11 was heated at 450° C. or 500° C. for 50 hours in the ambient atmosphere ($O_2$ concentration of 20.9 vol %) in an electric furnace without allowing oxygen to flow therein to combust and remove 1-adamantanamine in the pores.

Comparative Examples 5 and 6

The samples of the Comparative Examples 5 and 6 were manufactured with using a porous monolith substrate 1 (porous substrate having an outer diameter of 180 mm and an entire length of 1000 mm with 2050 through-holes (cells 2) having a diameter of 2.5 mm (see FIG. 1, both ends being sealed with glass)) in the same manner as in Examples 5 and 6. That is, the zeolite membrane 11 was synthesized by a heating treatment (hydrothermal synthesis) at 135° C. for 52 or 62 hours with using slurry for seeding diluted by ethanol in the same manner as in above (1) to (3). The He permeation amount of the membrane after hydrothermal synthesis was not more than the measurement limit (<0.018 L/min·m²·kPa), and it was confirmed that the cells 2 of the monolith substrate 1 were coated with the DDR membrane. In the (4) structure-directing agent step, the coated membrane 11 was heated at 450° C. for 50 hours in the ambient atmosphere ($O_2$ concentration of 20.9 vol %) in an electric furnace without allowing oxygen to flow therein to combust and remove 1-adamantanamine in the pores.

Example 7

Example 7 was produced in the same manner as in Examples 1 to 4. That is, in the same manner as in the aforementioned (1) to (3), the zeolite membrane 11 was synthesized by hydrothermal synthesis in the same manner as in Examples 1 to 4 with using slurry for seeding diluted by ion-exchange water or ethanol. The He permeation amount of the membrane after hydrothermal synthesis was not more than the measurement limit (<0.018 L/min·m²·kPa), and it was confirmed that the cells 2 of the monolith substrate 1 were coated with the DDR membrane. In the (4) structure-directing agent step, heating was performed at 450° C. for 50 hours with allowing oxygen to flow therein to combust and remove 1-adamantanamine as the structure-directing agent in the pores. Incidentally, by allowing oxygen to flow therein, the $O_2$ concentration in the furnace was 90 vol % or more.

Example 8

Example 8 was produced in the same manner as in Examples 1 to 4. That is, in the same manner as in the aforementioned (1) to (3), the zeolite membrane 11 was synthesized by hydrothermal synthesis in the same manner as in Examples 1 to 4 with using slurry for seeding diluted by ion-exchange water or ethanol. The He permeation amount of the membrane after hydrothermal synthesis was not more than the measurement limit (<0.018 L/min·m²·kPa), and it was confirmed that the cells 2 of the monolith substrate 1 were coated with the DDR membrane. In the (4) structure-directing agent step, heating was performed at 450° C. for 50 hours with allowing oxygen to flow therein to combust and remove 1-adamantanamine as the structure-directing agent in the pores. Incidentally, by allowing oxygen to flow therein, the $O_2$ concentration in the furnace was 35 vol % or more.

(5) X-Ray Diffraction

The crystal phase was evaluated by investigating the crystal phase of each membrane 11 obtained above by X-ray diffraction, and only diffraction peaks of DDR type zeolite and alumina as the substrate were detected. Incidentally, the "diffraction peak of DDR type zeolite" in X-ray diffraction means the diffraction peak described in No. 38-651 or No. 41-571 corresponding to Deca-dodecasil 3R shown in International Center for Diffraction Data (ICDD), "Powder Diffraction File".

Figure 5:
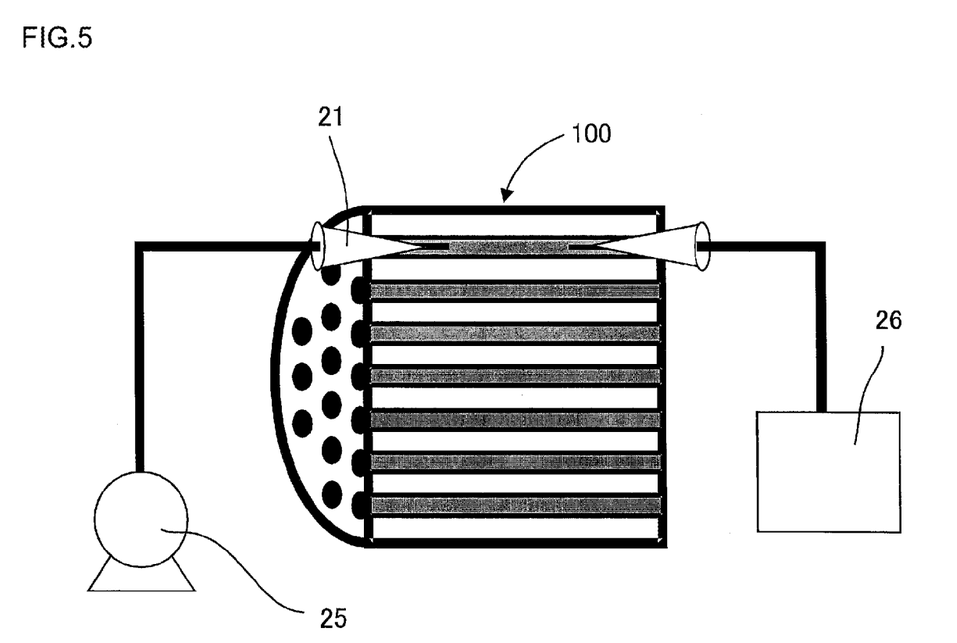
FIG. 5 is a view for describing measurement of a degree of vacuum.

(6) Measurement of Degree of Vacuum of Each Cell after Removal of Structure-Directing Agent In order to investigate the defect amount of the membrane 11 after the removal of the structure-directing agent, the degree of vacuum of each cell 2 was measured. One side of a cell 2 was sucked by a vacuum pump (directly-connected oil-sealed rotary vacuum pump, model G-20DA, produced by ULVAC, Inc., with an exhaust velocity of 24 L/min, an ultimate pressure of $1.3 \times 10^{-1}$ Pa, and two stages), a vacuometer (calibrator, model DPI800, produced by GE Sensing & Inspection Technologies) was connected to the other side of the cell 2 to vacuuming to measure the ultimate degree of vacuum in the cell 2 was measured (see FIG. 5).

Figure 2B:
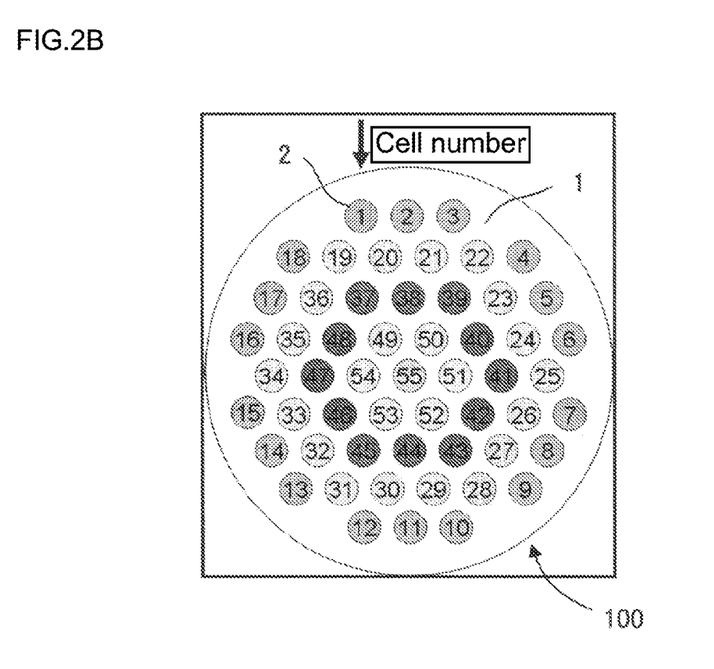
FIG. 2B is a view showing a cell number of a monolith substrate.
Figure 6:
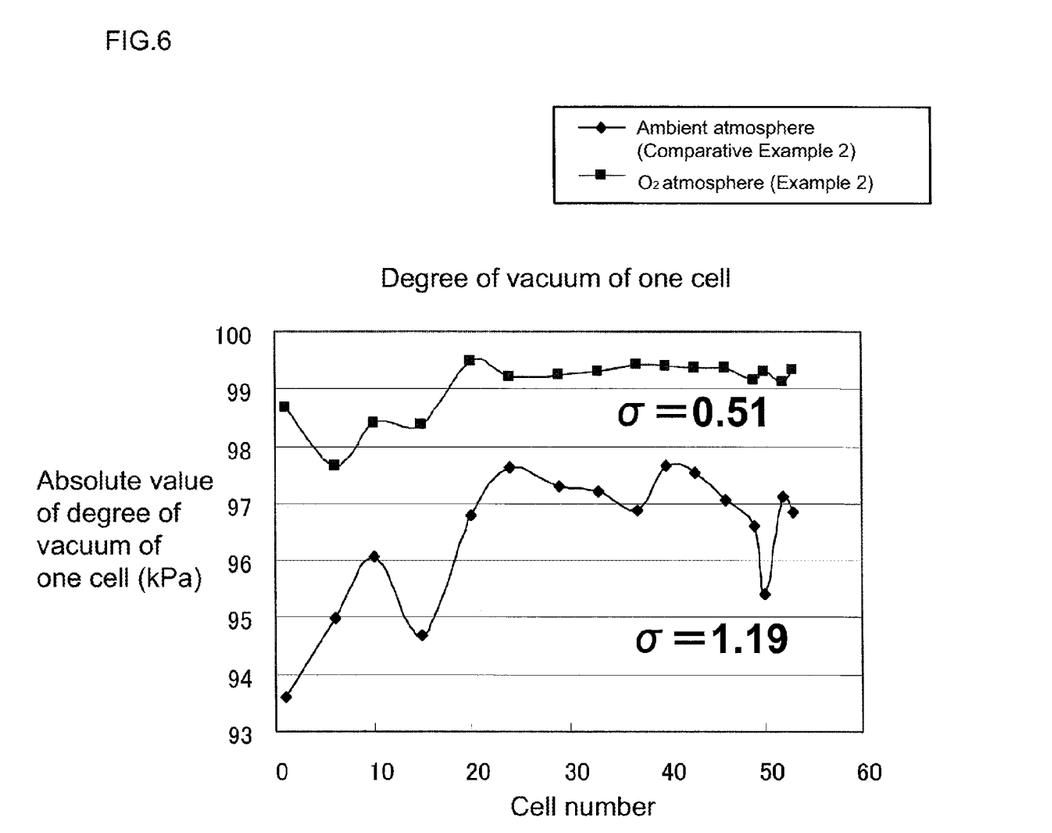
FIG. 6 is a graph showing a result of measurement of a degree of vacuum.

FIG. 6 shows degrees of vacuum of one cell of Example 2 and Comparative Example 2. It shows a degree of vacuum with respect to the cell numbers (see FIG. 2B). The standard deviations of the degree of vacuum of Example 2 and Comparative Example 2 were 0.51 and 1.19 kPa, respectively. Example 2, where the structure-directing agent was combusted and removed in an oxygen atmosphere, had a smaller standard deviation. That is, it can be said that a uniform zeolite membrane 11 was formed. Incidentally, all the membranes 11 in the other Examples had smaller standard deviations of a degree of vacuum of one cell 2 than that of Comparative Example (ambient atmosphere), and it was confirmed that a defect amount was reduced (see Table 1).

(7) Measurement of Gas Permeation Amount of Each Cell after Removal of Structure-Directing Agent In order to investigate the defect amount of the membrane 11 after removing the structure-directing agent, the $CF_4$ permeation amount of each cell 2 was measured. In the first place, one end of a cell 2 to be measured was sealed with a silicone plug. After the other end of the cell 2 was connected to a soap membrane flowmeter, $CF_4$ was supplied at 0.2 MPa from the outer surface of the monolith substrate 1, and the time until 0.5 cc of $CF_4$ leaked out from the cells 2 was measured to calculate the $CF_4$ permeation amount (see FIG.

2A). As a result of calculating the standard deviation of the $CF_4$ permeation amount from the $CF_4$ permeation amount data of each cell 2, the tendency of the standard deviation of the $CF_4$ permeation amount of each cell 2 coincided with that of the standard deviation of the degree of vacuum. Under the conditions of Examples, all the membranes 11 had standard deviations of a $CF_4$ permeation amount than that of Comparative Example (ambient atmosphere), and it was confirmed that a defect amount was reduced.

FIG. 7 shows the $CF_4$ permeation amounts of Example 2 and Comparative Example 2. It shows $CF_4$ permeation amounts with respect to the cell numbers (see FIG. 2B). The standard deviations of $CF_4$ permeation amounts of Example 2 and Comparative Example 2 were 0.71 and 9.14 $L/m^2 \cdot s \cdot MPa$, respectively. Example 2, where the structure-directing agent was combusted and removed in an oxygen atmosphere, had a smaller standard deviation. That is, it can be said that a uniform zeolite membrane 11 was formed. The results are shown in Table 1 collectively.

|  | Seed concentration (mass %) | Solvent | Synthesis condition Temperature (° C.) | Hour (h) | Template agent removal conditions Atmosphere | After removing Template agent Standard deviation of degree of vacuum of a cell (kPa) | Standard deviation of $CF_4$ of a cell ($L/m^2 \cdot s \cdot MPa$) |
|---|---|---|---|---|---|---|---|
| Example 1 | 0.020 | Water | 135 | 36 | $O_2$ | 0.33 | 0.40 |
| Comp. Ex. 1 | 0.020 | Water | 135 | 36 | Ambient | 1.09 | 8.15 |
| Example 2 | 0.006 | Water | 150 | 16 | $O_2$ | 0.51 | 0.71 |
| Comp. Ex. 2 | 0.006 | Water | 150 | 16 | Ambient | 1.19 | 9.14 |
| Example 3 | 0.006 | Water | 135 | 36 | $O_2$ | 0.08 | 0.04 |
| Comp. Ex. 3 | 0.006 | Water | 135 | 36 | Ambient | 1.70 | 6.33 |
| Example 4 | 0.006 | Ethanol | 135 | 44 | $O_2$ | 0.12 | 0.01 |
| Comp. Ex. 4 | 0.006 | Ethanol | 135 | 44 | Ambient | 1.52 | 14.38 |
| Example 5 | 0.018 | Ethanol | 135 | 52 | $O_2$ | 0.20 | 0.35 |
| Comp. Ex. 5 | 0.018 | Ethanol | 135 | 52 | Ambient | 3.83 | 12.35 |
| Example 6 | 0.006 | Ethanol | 135 | 62 | $O_2$ | 0.44 | 0.77 |
| Comp. Ex. 6 | 0.006 | Ethanol | 135 | 62 | Ambient | 3.25 | 11.93 |
| Example 7 | 0.006 | Ethanol | 135 | 44 | $O_2$ | 0.04 | 0.005 |
| Example 8 | 0.006 | Ethanol | 135 | 36 | $O_2$ | 0.66 | 2.05 |

As shown in Table 1, Examples, where the structure-directing agent was removed in an $O_2$ atmosphere in the structure-directing agent removal step, had smaller standard deviations of the vacuum of degree of one cell than that of Comparative Examples, where the structure-directing agent was removed in the ambient atmosphere. That is, in Examples, the deviation of the degree of vacuum of each cell was small. In addition, the standard deviation of the $CF_4$ permeation amount of one cell was small in Examples in comparison with Comparative Examples.

Industrial Applicability

The present invention can be used as a process for producing a zeolite membrane, the process being used for a gas separation membrane, a pervaporation membrane, and the like.

Description of Reference Numerals

1: substrate, 2: cell, 2n: longest diameter, 2s: internal wall face, 3: side face, 4: end face, 11: separation membrane (zeolite membrane), 12: sealing portion, 21: plug, 22: flowmeter, 23: gas cylinder, 25: vacuum pump, 26: vacuometer, 32: funnel, 33: cock, 34: slurry (slurry for seeding), 35: pressure-resistant container, 37: sol, 38: dryer, 100: zeolite membrane-provided body

The invention claimed is:

1. A zeolite membrane formed on internal wall faces of cells of a porous monolith substrate having a plurality of cells formed from one end face to the other end face in a longitudinal direction, wherein the zeolite membrane is formed so that standard deviation of gas permeation amount of each cell formed in the longitudinal direction of the monolith substrate after removing a structure-directing agent, which is measured by using a gas having a molecular diameter larger than a pore diameter of zeolite, is 6 [$L/m^2 \cdot s \cdot MPa$] or less.

2. The zeolite membrane according to claim 1, wherein the monolith substrate has an outer diameter of 28 mm or more and an entire length of 100 mm or more.

3. The zeolite membrane according to claim 1, wherein the monolith substrate has a plurality of cells at a rate of 1 cell/$cm^2$ or more in a unit area of the aforementioned end face of the monolith substrate.

4. The zeolite membrane according to claim 2, wherein a zeolite membrane has a plurality of cells at a rate of 1 cell/$cm^2$ or more in a unit area of the aforementioned end face of the monolith substrate.

5. The zeolite membrane according to claim 1, wherein the length of the longest diameter in a cross section of a cell perpendicular to the longitudinal direction of the cell of the monolith substrate is 10 mm or less.

6. The zeolite membrane according to claim 4, wherein the length of the longest diameter in a cross section of a cell perpendicular to the longitudinal direction of the cell of the monolith substrate is 10 mm or less.

7. The zeolite membrane according to claim 1, wherein the zeolite membrane is DDR type zeolite membrane.

8. The zeolite membrane according to claim 6, wherein the zeolite membrane is DDR type zeolite membrane.

9. The zeolite membrane according to claim 1, wherein the gas having a molecular diameter larger than the pore diameter of zeolite is $CF_4$.

10. The zeolite membrane according to claim 8, wherein the gas having a molecular diameter larger than the pore diameter of zeolite is $CF_4$.

11. A process for producing a zeolite membrane, comprising:
    forming a zeolite membrane containing a structure-directing agent on a monolith substrate having a plurality of cells by hydrothermal synthesis; and
    heating the zeolite membrane in an atmosphere having an $O_2$ concentration of 22.0 vol % or more to remove the structure-directing agent from the zeolite membrane.

12. The process for producing a zeolite membrane according to claim 11, the method further comprising: a particle adhesion step of allowing zeolite particles functioning as seeds to adhere to the monolith substrate, and a membrane-forming step of forming a zeolite membrane on the monolith substrate by immersing the substrate having the zeolite particles adhering thereto in sol containing the structure-directing agent for hydrothermal synthesis.

13. The process for producing a zeolite membrane according to claim 11, wherein the zeolite membrane is a DDR type zeolite membrane.

14. The process for producing a zeolite membrane according to claim 11, wherein the structure-directing agent removal temperature for removing the structure-directing agent is 300° C. or more.

15. A zeolite membrane obtained by the process for producing a zeolite membrane according to claim 11.

16. The process for producing a zeolite membrane according to claim 12, wherein the particle adhesion step is a step of adhering the zeolite particles on surfaces of cells of the monolith substrate by allowing the slurry including the zeolite particles to flow into the cells and down inside the cells by means of the weight of the slurry itself.

* * * * *